Sept. 14, 1926.

D. LAKE

POWER TRANSMITTING APPARATUS
Filed Jan. 14, 1922

Inventor.
David Lake.
by his Attorneys.
Howson & Howson

Sept. 14, 1926.

D. LAKE 1,600,117

POWER TRANSMITTING APPARATUS

Filed Jan. 14, 1922   4 Sheets-Sheet 2

Inventor.
David Lake.
by his Attorneys
Howson & Howson

Sept. 14, 1926.  1,600,117
D. LAKE
POWER TRANSMITTING APPARATUS
Filed Jan. 14, 1922    4 Sheets-Sheet 3
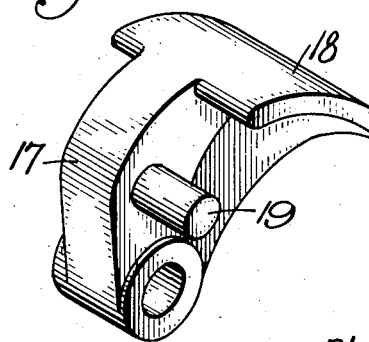
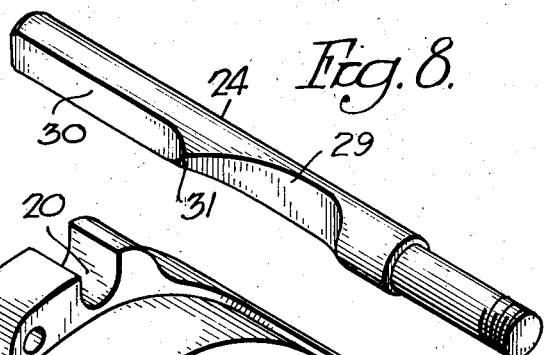
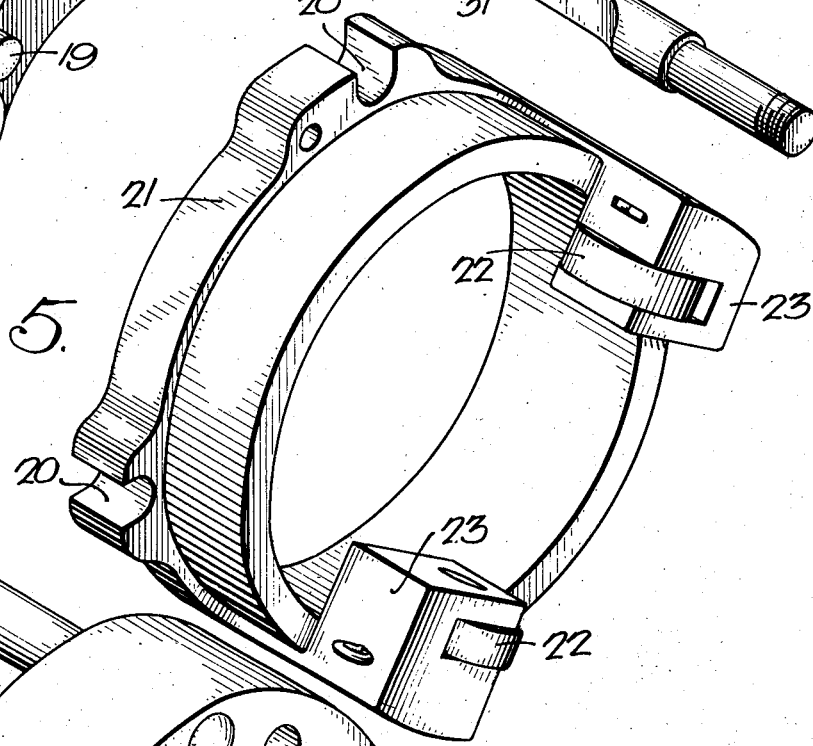
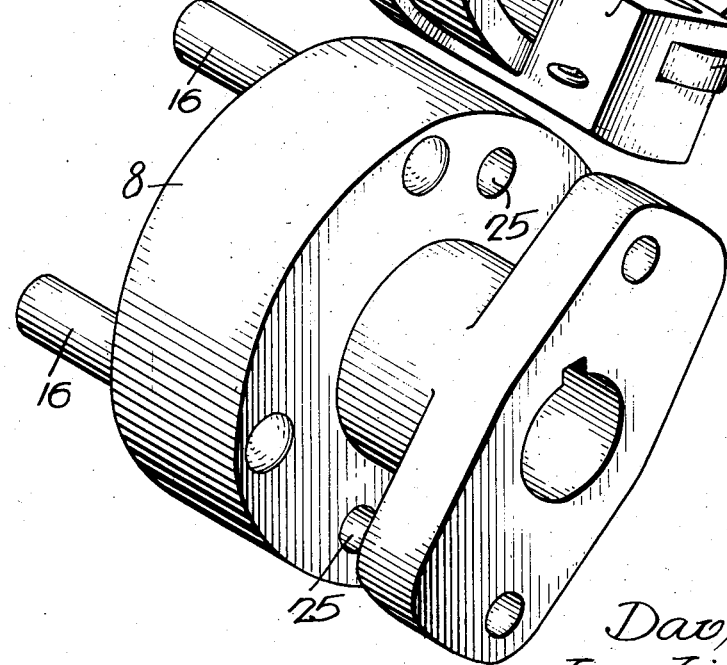

Sept. 14, 1926.
D. LAKE
POWER TRANSMITTING APPARATUS
Filed Jan. 14, 1922
1,600,117
4 Sheets-Sheet 4
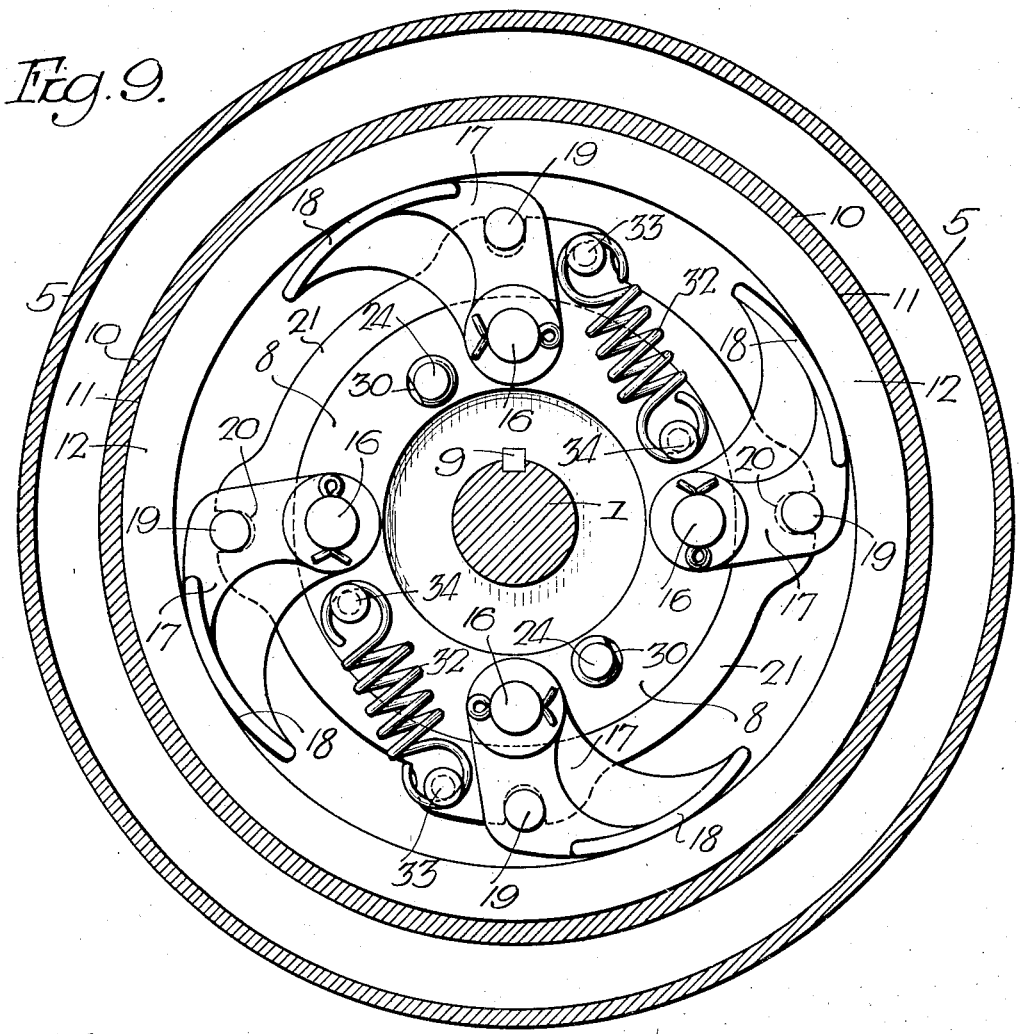
Fig. 9.
Fig. 10.
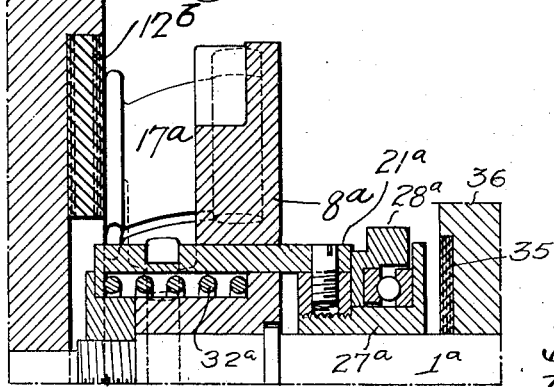
Inventor-
David Lake.
by his Attorneys
Howson & Howson Patented Sept. 14, 1926.

1,600,117

UNITED STATES PATENT OFFICE.

DAVID LAKE, OF CLEVELAND, OHIO.

POWER-TRANSMITTING APPARATUS.

Application filed January 14, 1922. Serial No. 529,159.

The object of my invention is to apply a new principal to power transmitting apparatus, viz, the insertion between the driving and driven members of a floating resilient mass, which, when power is applied, permits a slippage between the driving member and the transmitting member and also permits slippage between the transmitting member and the driven member and utilizes the friction between the transmitting member and the contact surface of engaging shoes to rotate the latter on their axes, causing further and further impinging of the contact surfaces upon the transmitting member and consequent deformation in the latter under the influence of the torque caused by the transmission of power to such a degree that further slippage is prevented. At this point there is no relative motion between the driving and driven members.

This case is a continuation, as to all common subject matter, of application Serial No. 397,062, filed July 17, 1920.
In the accompanying drawings:

Fig. 1 is a longitudinal sectional view of my improved power transmitting apparatus, the section being on the line 1—1, Fig. 2;
Fig. 2 is a face view looking in the direction of the arrow a, Fig. 1, with a part of the driving member in section and showing the shoes in contact with the transmitting member;
Fig. 3 is a view of a portion of the power transmitting apparatus similar to Fig. 2 and showing the shoes out of contact with the transmitting member;

Fig. 4 is a perspective view of the hub;
Fig. 5 is a perspective view of the compensating ring;

Fig. 6 is a detached perspective view of one of the shoes;

Fig. 8 is a perspective view of one of the cam rods;

Fig. 9 is a sectional view on the line 9—9, Fig. 1; and Fig. 10 is a view illustrating my invention applied to a power transmitting apparatus using a flat disk.

Figure 1:
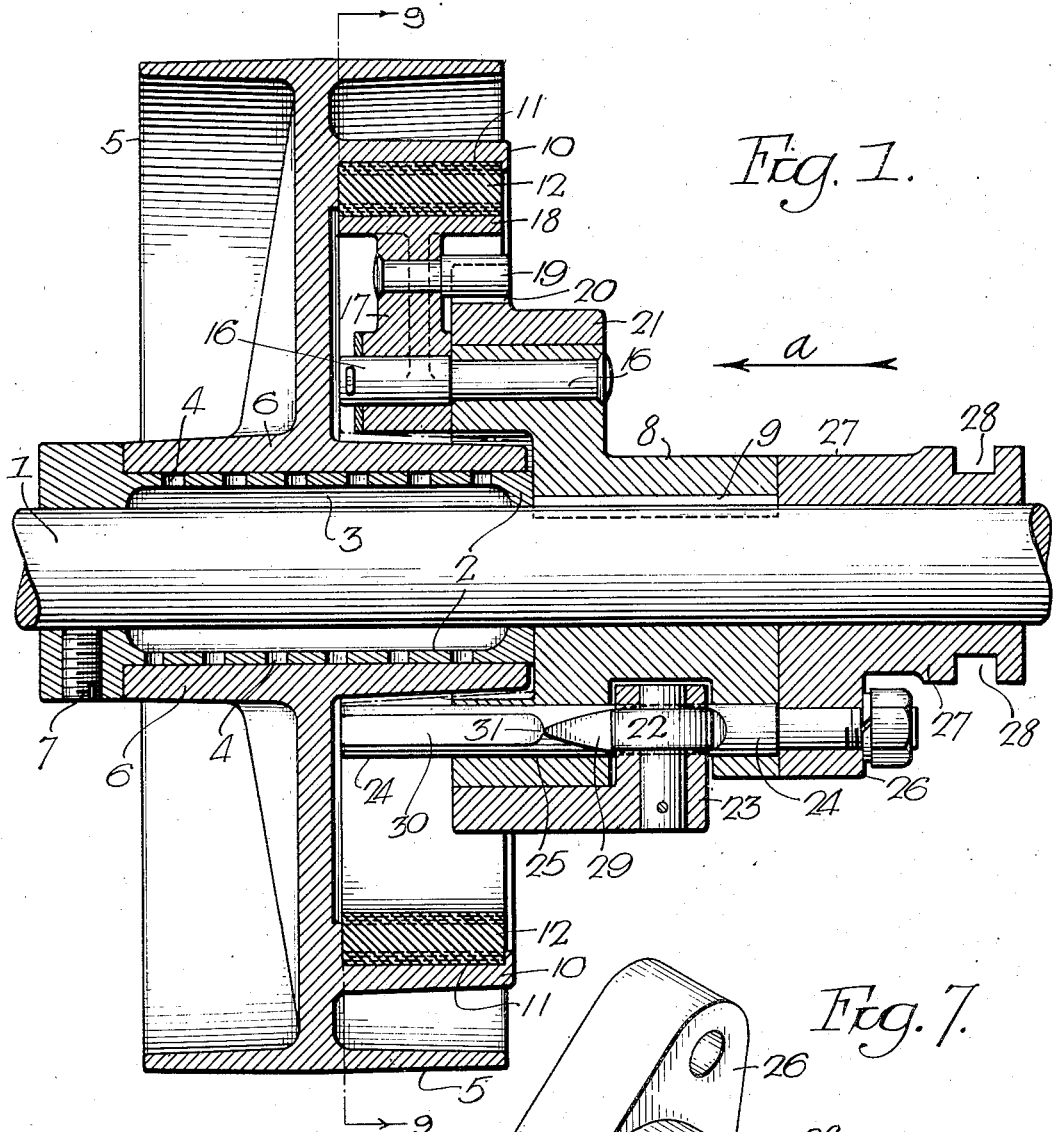
Figure 7:
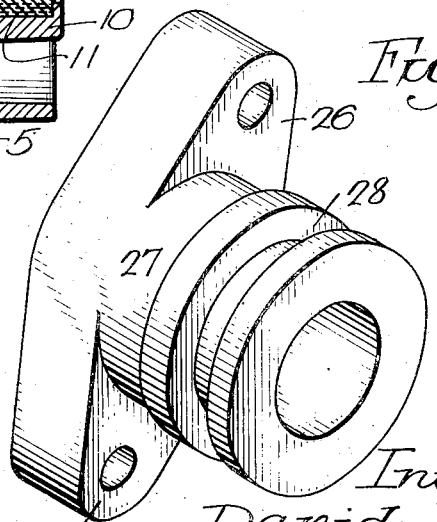
Fig. 7 is a detached perspective view of the shifting spool.
Figure 2:
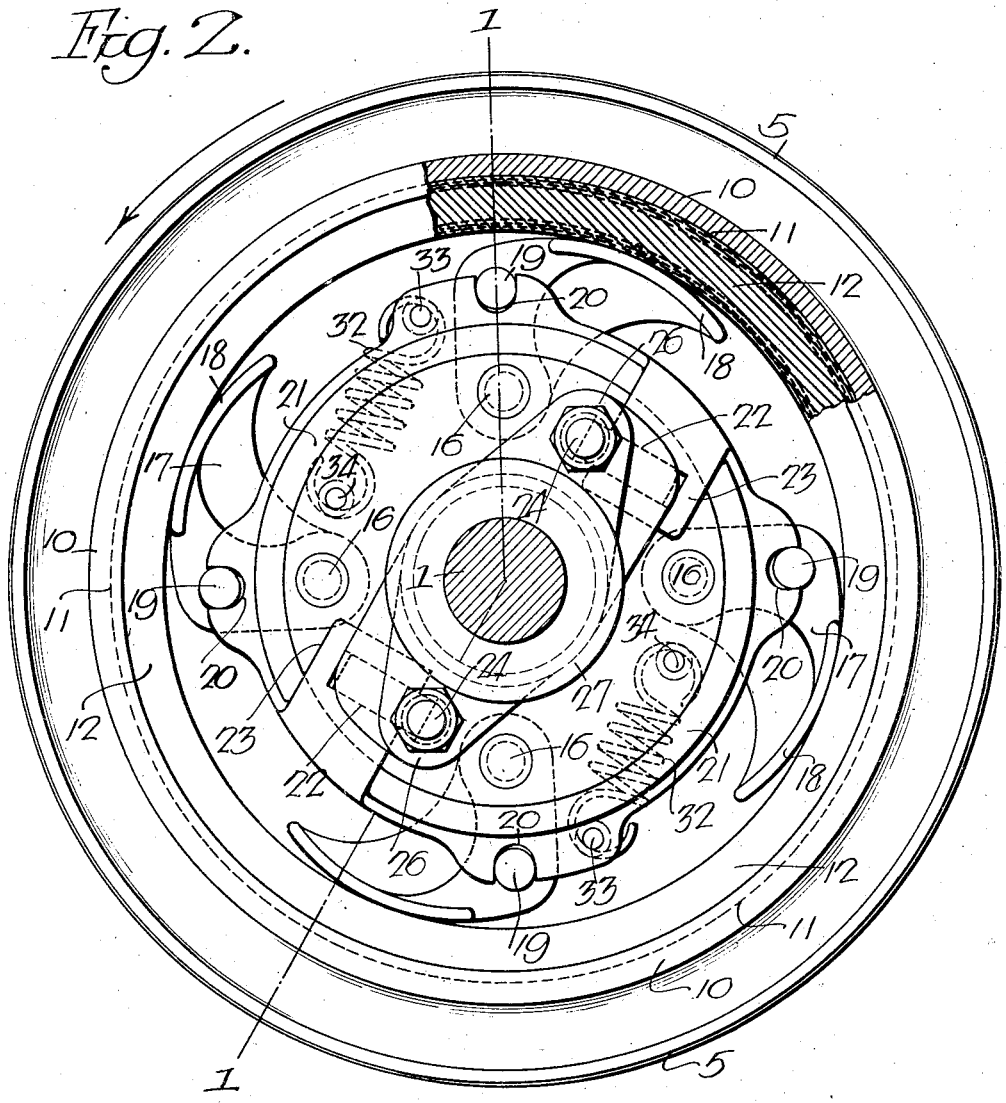

While my invention is illustrated as applied to what is commonly termed "a clutch," it will be understood that it is not limited to this particular application, as it is in whole or in part applicable to a variety of apparatus for transmitting power.

Referring to the drawings, 1 is a shaft, which, in the present instance, is the driven member. Secured to the shaft is a hollow bushing 2 having a chamber 3 for lubricant and having a series of perforations 4 to lubricate the bearing of the hub 6 of the belt wheel 5, which is the driving member. This driving member is free to rotate on the bushing. The bushing is held to the shaft, in the present instance, by a set screw 7 and the driving member is confined against longitudinal movement by a shoulder on one end of the bushing and by the hub 8, which is secured to the shaft 1 by a key 9 and forms part of the driven member. Projecting from the driving member 5 is an annular flange 10. This flange is recessed at 11, in the present instance, to receive the transmitting member 12. This transmitting member is loosely mounted in the recess so that it forms a floating member. This member may be of any composition that will form a resilient mass. Practical experiments have proven that a core of rubber located between two strips of cotton fabric, which is vulcanized, produces satisfactory results.

Projecting from the hub 8 are four studs 16. Mounted on each stud is a shoe 17, shaped as shown in Fig. 6, and having a wide, curved bearing surface 18, preferably of the width of the transmitting member. On each shoe is a pin 19, which projects into a slot 20 in a compensating ring 21 loosely mounted on the hub 8. This ring, while free to turn on the hub, has its movement limited by two rollers 22, mounted upon studs, which are carried by lugs 23 on the ring 21. Each of the two rollers comes in contact with a cam rod 24. The cam rods extend through openings 25 in the hub and are attached to projections 26 on a shifting spool 27, loosely mounted on the shaft 1. This spool is grooved, as at 28, to receive the portions of a shifting lever, which is used to move the spool longitudinally on the shaft. Each cam rod is made as shown in Fig. 8 and has a tapered portion 29 against which the roller 22 comes in contact. Beyond this tapered portion 29 is a flat portion 30 and separating the two portions is a slight shoulder 31.

Figure 3:
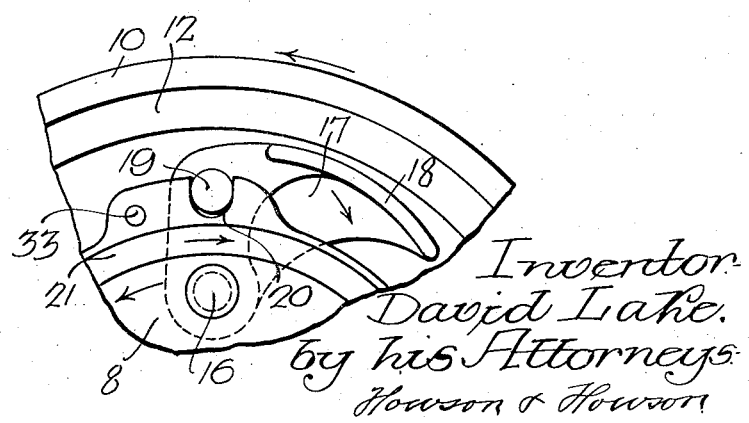

When the shifting spool is in the position shown in Fig. 1, then the rollers are in the deep portions of the cam rods 24. When the shifting spool 27 is moved away from the hub 8, then the tapered portions 29 of the rods act to turn the compensating ring so as to withdraw the shoes clear of the transmitting member. On the continued movement of the shifting spool, the shoulder 31, on each cam rod, passes its roller. These rollers finally rest on the flat surfaces 30 of their corresponding rods, the shoulders 31 positively holding the ring 21 against accidental or unintended rotation, and hence, holding the shoes out of action as illustrated in Fig. 3.

32 are two springs, which engage pins 33 on the compensating ring 31 and pins 34 on the hub. These springs tend to turn the ring 21 and move the shoes into contact with the transmitting member, but, on the reverse movement of the shifting spool, the parts will yield on the movement of the cam rods 24 so as to allow the shoes to be withdrawn clear of the transmitting member.

The operation is as follows: When it is desired to transmit motion from the driving member, which, in the present instance, is the belt wheel 5, to the driven member, which is the shaft 1, the shifting spool is moved towards the hub 8. This movement permits the shoes 17 to travel outwardly, the curvilinear surface of each shoe engaging the cylindrical surface of the transmitting member. As the shoes are arranged eccentrically in respect to the transmitting member, the friction between each shoe and the transmitting member is sufficiently great to carry the shoes still farther into engagement with the transmitting member, but the tendency of the transmitting member is to rotate each shoe on its fulcrum. At the same time the transmitting member is pressed against the surface of the flange of the driving member.

The actual engagement of the shoes and actual distance they can rotate on their fulcrums are controlled by the operating mechanism as the shoes are rotated by the power of the wheel and not by the force exerted by the operator.

The shoes are imbedded in the transmitting member to an extent varying in degree with the degree to which such motion of the shoes is permitted by the operator. As the wheel rotates, while the hub carrying the shoes stands still before the mechanism begins to function, this indentation is compelled to progress in a circle and the character of the material of the transmitting member and its consequent response to deformation will determine the length of time required until a condition is reached where the driving and driven members rotate at the same speed.

There may be a slight rotary progressive movement proper in the various portions of the transmitting member, and, in addition thereto, a wave motion, whereby the material directly adjacent to, or under each shoe, is pushed away to both ends to make an indentation. As soon as a shoe passes a given point the depression fills up immediately with the identical material in place before depression—a new depression is created ahead of the first one and eliminated—a third depression is made, and so on, all around the circle.

The design of the shoes may be altered to allow for a sudden or slow engagement. In the transmission of power, the load is constantly varying to a greater or less degree, the transmitting member having more or less of a cushion effect absorbs these vibrations. It is the results of these vibrations that permit the withdrawal of the shoes from contact with the transmitting member with minimum effort.

Where circumstances require, constant rotation of the member carrying the shoes makes it the driver instead of the driven member.

In the drawings, the invention is illustrated as applied to a clutch pulley and the shifting spool 27 is moved by the operator in both directions. When the invention is applied to a motor car, for instance, the foot pedal may be arranged to draw the clutch out of the engaging position, while a spring will act to throw the clutch into engaging position. In this latter case, the control cam, which causes a movement of the compensating ring, is modified so as to have no locked position.

While the transmitting member is described as being made in a particular manner, it will be understood that this transmitting member may be modified considerably without departing from the main feature of the invention, which is to make said member so that it can be deformed when power is applied, but which will return to its normal position when the device is not transmitting power.

In Fig. 10, the invention is shown applied to a disk clutch. On the driving member 5ª is a cushioned pad 12ᵇ, which forms the transmitting member. The shoes 17ª are pivotally mounted in sockets in the driving hub 8ª, secured to the shaft 1ª.

21ª designates a compensating ring and 32ª designates the engaging spring. The shifting sleeve 27ª slides on the shaft and is secured to the compensating ring. 28ª designates a collar on the shifting sleeve, which may be engaged by a lever, or other shifting means. On the transmission case 36 is a brake lining 35, against which the shifting sleeve comes in contact when reversed.

In some of the claims I have referred to the shoes as carried by the driven member, but it will be understood that when the member carrying the shoes is the driving member, then the wheel becomes the driven member. My claims are drawn to cover the construction illustrated regardless of which member is actually driven.

I claim:

1. The combination in a power transmission, of driving and driven members; segmental elements carried by one of said members; compressible, resilient material between the segmental elements and the opposite driving or driven members; and means for actuating said segmental elements to cause them to engage and deform the compressible, resilient material.

2. The combination in a power transmission, of driving and driven members; a floating pad of compressible, resilient material; and movable means on one of said members for engaging and deforming the pad so that the resistance to such deformation supplies the transmitting energy.

3. The combination in a power transmission, of a driving member; a driven member; a floating transmitting member; means whereby contact is made between the driving member and the floating member, and the floating member and the driven member; and segmental means for deforming the floating transmitting member to the extent necessary to transmit the load.

4. The combination in a power transmission, of driving and driven members; shoes carried by one of said parts; a compressible resilient transmitting member located between the driving and driven members, the faces of the shoes being eccentric to the transmitting member; and means for moving said shoes into contact with the transmitting member so that the power itself will effect the clutching of the parts.

5. The combination in a power transmission, of a driving member; a resilient body forming the transmitting member; a carrier hub; two or more shoes pivotally mounted on the carrier hub, all shoes arranged to come uniformly in contact with the surface of the resilient body; and yielding means tending to move the shoes into contact with the resilient body; and means for positively retracting the shoes.

6. The combination in a power transmission, of a driving member; a resilient body forming a transmitting member; a carrier hub; two or more shoes pivotally mounted on the carrier hub, all shoes arranged to come uniformly in contact with the surface of the resilient body; yielding means tending to move the shoes into contact with the resilient body; and means for positively retracting the shoes.

7. The combination in a power transmission, of a driving member; a floating transmitting member housed therein; a shaft on which the driving member is mounted loosely; a carrier hub forming the driven member, said carrier hub having studs; shoes pivotally mounted on the studs and having a bearing face arranged to come in contact when projected with the surface of the transmitting member; yielding means for moving the shoes into contact with the transmitting member; and positive means for withdrawing the shoes from contact with said member.

8. The combination in a power transmission, of a driving member; an annular transmitting member located in the driving member; a driven member consisting of a hub; a shaft on which the hub is mounted; studs projecting from the hub; a shoe pivotally mounted on each stud and having an eccentric bearing surface arranged to come in contact with the surface of the transmitting member; a compensating ring mounted on the hub and engaging the shoes; and means for moving the ring to allow the shoes to come into uniform contact with the surface of the transmitting member, or uniformly to withdraw the shoes from said transmitting member.

9. The combination in a power transmission, of a shaft; a driving element loosely mounted on the shaft; an internal transmitting member arranged to float therein; a carrier hub, also mounted on the shaft; shoes pivoted to the carrier hub, said shoes having bearing faces eccentric to the transmitting member; means for projecting the bearing faces of the shoes against the transmitting member; and means for positively retracting the shoes.

10. The combination of a driving member and a driven member; a compressible, resilient floating member capable of being depressed; shoes formed to cause an increasing impinging action upon the transmitting member; and means for moving the shoes to and from the transmitting member.

11. The combination of a driving member and a driven member; a loose cushioned friction ring forming a transmitting member; and shoes carried by the driven member whose bearing faces are arranged eccentric to the friction ring; and means for moving said shoes in the path of the friction ring.

12. The combination of a driving member and a driven member; an annular floating, yieldable transmitting member located between the two parts; and means, on one of said parts, for progressively deforming one surface of said transmitting member to connect it operatively with the driving and driven members.

13. The combination of a driving member; a driven member; shoes carried by one of said members; a floating, transmitting member located between the shoes and the other member; and means for moving said shoes into and out of contact with said transmitting member, the shoes being tapered to be drawn into the power transmitting member by the action of the driving member to connect the said members operatively.

14. An annular, floating transmitting member for a power transmitting apparatus consisting of a compressible resilient core and wearing faces.

DAVID LAKE.